(12) United States Patent
Lee et al.

(10) Patent No.: US 10,587,569 B2
(45) Date of Patent: Mar. 10, 2020

(54) STREAMING SERVICE PROVIDING METHOD AND DEVICE

(71) Applicant: SK Telecom Co., Ltd., Seoul (KR)

(72) Inventors: Jongmin Lee, Seoul (KR); Youngjae Shim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 262 days.

(21) Appl. No.: 15/458,029

(22) Filed: Mar. 14, 2017

(65) Prior Publication Data

US 2017/0187674 A1 Jun. 29, 2017

Related U.S. Application Data

(63) Continuation of application No. PCT/KR2015/009856, filed on Sep. 21, 2015.

(30) Foreign Application Priority Data

Nov. 18, 2014 (KR) .................... 10-2014-0160945

(51) Int. Cl.
*H04L 29/12* (2006.01)
*H04L 29/06* (2006.01)
*H04L 29/08* (2006.01)

(52) U.S. Cl.
CPC ...... *H04L 61/1511* (2013.01); *H04L 61/2069* (2013.01); *H04L 65/4076* (2013.01); *H04L 67/10* (2013.01); *H04L 67/42* (2013.01)

(58) Field of Classification Search
CPC . H04L 61/1511; H04L 61/2069; H04L 67/10; H04L 65/4076; H04L 67/42
See application file for complete search history.

(56) References Cited

U.S. PATENT DOCUMENTS

| | | | |
|---|---|---|---|
| 2008/0301744 A1* | 12/2008 | Hutchings | H04L 29/12066 725/110 |
| 2010/0100908 A1* | 4/2010 | Zhang | H04N 7/17318 725/51 |
| 2012/0110159 A1* | 5/2012 | Richardson | H04L 29/06 709/223 |

(Continued)

FOREIGN PATENT DOCUMENTS

| | | |
|---|---|---|
| CN | 101321152 A | 12/2008 |
| CN | 102970391 A | 3/2013 |

(Continued)

OTHER PUBLICATIONS

International Search Report dated Jan. 25, 2016 corresponding to International Application PCT/KR2015/009856.

(Continued)

*Primary Examiner* — Soe Hlaing
(74) *Attorney, Agent, or Firm* — Hauptman Ham, LLP

(57) ABSTRACT

The present disclosure relates to a streaming service providing method and, more specifically, to a streaming service providing method and device by which a service control server having a domain name server (DNS) function can support a streaming service of a multicast scheme by providing, to a terminal, a multicast group address allocated in correspondence to a specific Internet service server in response to a domain inquiry message for the Internet service server from the terminal.

4 Claims, 6 Drawing Sheets

(56) References Cited

U.S. PATENT DOCUMENTS

| | | | |
|---|---|---|---|
| 2013/0254269 A1 | 9/2013 | Sivasubramanian et al. | |
| 2014/0269703 A1 | 9/2014 | Sundaresan et al. | |
| 2016/0080445 A1* | 3/2016 | Kazerani ............ | H04L 65/4076 |
| | | | 709/219 |

FOREIGN PATENT DOCUMENTS

| | | |
|---|---|---|
| JP | 2006-165604 A | 6/2006 |
| JP | 2008-160196 A | 7/2008 |
| JP | 2012-50085 A | 3/2012 |
| KR | 10-2001-0020190 A | 3/2001 |

OTHER PUBLICATIONS

Chinese Office Action for corresponding Chinese application No. 201580060578.9 dated Sep. 11, 2019.

* cited by examiner

STREAMING SERVICE PROVIDING METHOD AND DEVICE

CROSS-REFERENCE TO RELATED APPLICATION

This application is a continuation of International Application No. PCT/KR2015/009856, filed Sep. 21, 2015, which claims the priority to and the benefit of Korean Patent Application No. 10-2014-0160945 filed in the Korean Intellectual Property Office on Nov. 18, 2014. The disclosures of above-listed applications are hereby incorporated by reference in their entirely.

TECHNICAL FIELD

The present disclosure relates to a method for providing a streaming service, and more particularly, to a method and device for providing a streaming service in which a service control server having a domain name server (DNS) function supports a streaming service based on multicast technique by providing, to a terminal, a multicast group address allocated to a specific internet service server in response to a domain query message for the internet service server from the terminal.

BACKGROUND

Details disclosed herein merely offer background information regarding embodiments and are not applicable as prior art.

Streaming refers to the transmission of content, such as video or audio, from a server to a client over a network such as the Internet. Since data is processed as if water is flowing, it is called streaming. The server divides the data into a plurality of packets to be delivered to the client, and the client collects the packets received from the server, restores the packets to their original form, and plays them. At this time, playback and packet reception occur at the same time, and a series of related packets is called a stream.

In such a streaming service, an internet service server that desires to provide a streaming service transmits streaming data to a receiver in a unicast mode. Unicast is technique for transmitting streaming data to one receiver. In case of using unicast technique, the internet service server transmits duplicate same stream to all connected receivers. This invites a problem of causing excessive server load and unnecessary use of network resources due to redundant traffic. Another problem is that it is difficult to use a high-quality streaming service due to a delay in reception since a receiver uses a streaming service through a general internet network.

In recent years, multicast technique is attracting attention, in which receivers are managed as a group and data is transmitted to a limited number of receivers belonging to the group. In a multicast mode, when the internet service server that serves as a source transmits one streaming data, a plurality of routers capable of operating according to a multicast protocol copy and deliver the streaming data.

Compared with the unicast mode, the multicast mode can reduce the overhead of concentrating on the internet service server and also does not transmit duplicate streaming data on the network. This allows more efficient utilization of network resources.

However, even though there is a need to provide a streaming service in such a multicast mode, the inventor(s) has experienced that the internet service server that does not construct its own multicast network has many problems in application.

SUMMARY

In order to accomplish the above objects, in a multicast system including a service control server having a domain name server (DNS) function, a streaming server for supporting provision of a streaming service, and a plurality of routers for delivering streaming data, in a multicast mode, received from the streaming server, a streaming service providing method according to one or more embodiments of the present disclosure may include steps of: at the service control server, receiving a domain query message for a specific internet service server from a terminal; and at the service control server, supporting a use of a streaming service of the terminal by transmitting a domain response message containing a multicast group address allocated to the internet service server to the terminal in response to the domain query message.

In order to accomplish the above objects, in a multicast system including a service control server having a domain name server (DNS) function, a streaming server for supporting provision of a streaming service, and a plurality of routers for delivering streaming data, in a multicast mode, received from the streaming server, the service control server may include a domain query processing module configured to receive a domain query message for a specific internet service server from a terminal, to create a domain response message containing a multicast group address allocated to the internet service server in response to the domain query message, and to transmit the created domain response message to the terminal.

DETAILED DESCRIPTION

Figure 1:
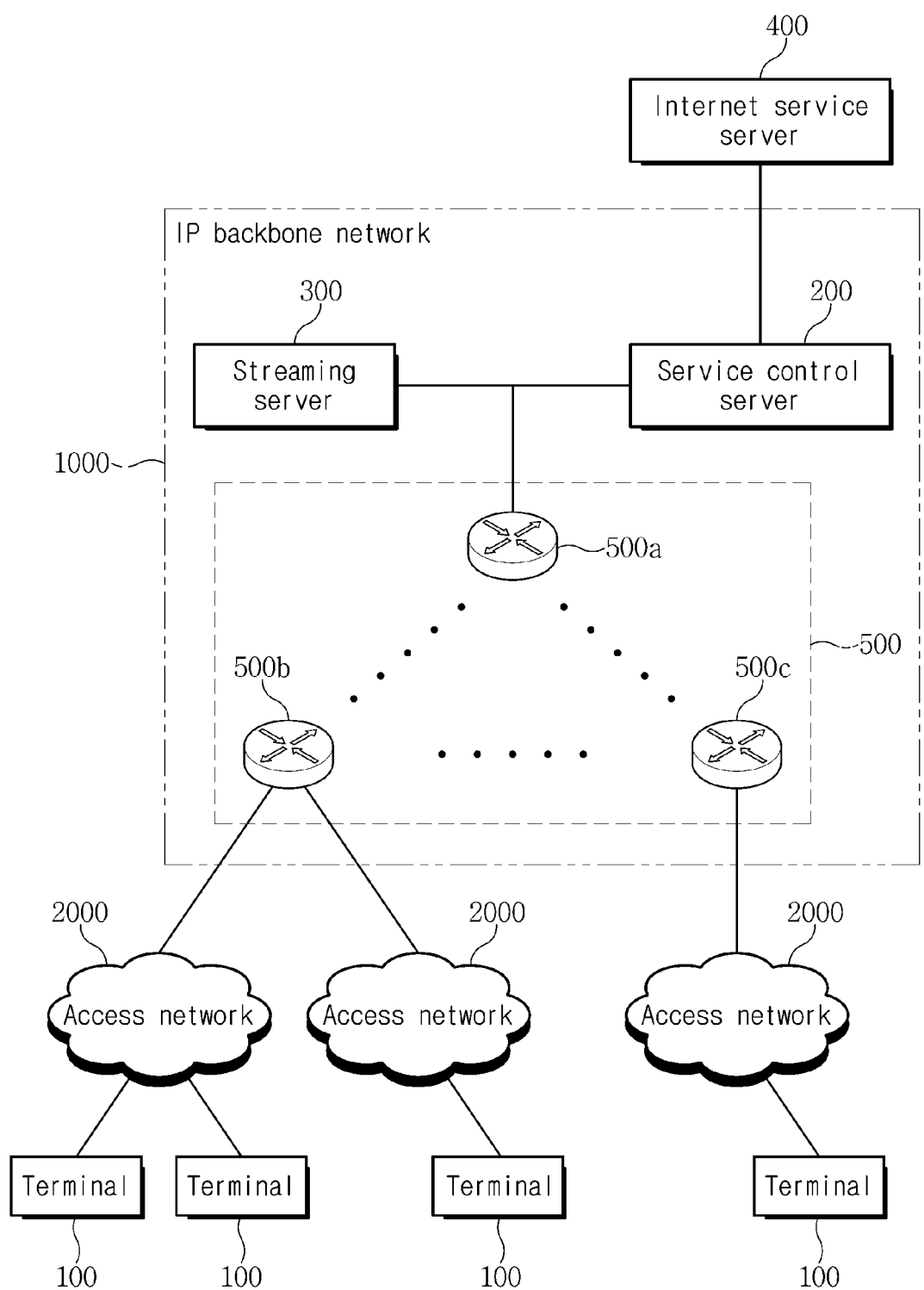
FIG. 1 is an exemplary diagram illustrating a system to which a streaming service providing method according to one or more embodiments.

Hereinafter, embodiments of the present disclosure will be described with reference to the accompanying drawings. In the description of embodiments of the present disclosure, well known functions or elements may not be described or illustrated in detail to avoid obscuring the subject matter of the present disclosure. While the following description is particularly shown and described with reference to exemplary embodiments thereof, the following description of exemplary embodiments is provided for illustration purpose only and not for the purpose of limiting the disclosure as defined by the appended claims and their equivalents.

Additionally, the terms including expressions "first", "second", etc. are used for merely distinguishing one element from other elements but do not limit the corresponding elements. The above expressions do not limit the sequence and/or importance of the elements.

Further, when it is stated that a certain element is "coupled to" or "connected to" another element, the element may be logically or physically coupled to or connected to another element. Namely, the element may be directly coupled or connected to another element, or a new element may exist between both elements.

Also, the terms used in describing various embodiments of the present disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include", "comprise", and "have" as well as derivatives thereof, mean inclusion without limitation.

Now, a streaming service providing method according to embodiments of the present disclosure will be described in detail with reference to the drawings. Through the drawings, the same or similar reference numerals denote corresponding features consistently.

The term streaming data described herein is a concept that includes various kinds of data, for example, various data formats such as a moving picture, a text, a still image, and the like that can be provided in a streaming form. Also, data that can be represented by a specific address (e.g., a URL) on the network, for example, the entire website, may be distributed as streaming data of the present disclosure to a terminal.

At the outset, a system to which a streaming service providing method according to one or more embodiments of the present disclosure will be described.

FIG. 1 is an exemplary diagram illustrating a system to which a streaming service providing method according to one or more embodiments.

Referring to FIG. 1, an operator's service control server 200 the present disclosure that constructs a multicast-based IP backbone network 1000 supports a pre-agreed internet service server 400 to provide a streaming service to a terminal 100.

The service control server 200 and the internet service server 400 may be in a state where a paid-peering arrangement is concluded. The internet service server 400 located at the outside of the IP backbone network 1000 may be connected with the service control server 200 through an Internet network (not shown) as a public network.

Describing respective elements that constitute the multicast system of the present disclosure, the terminal 100 refers to a user's device capable of transmitting or receiving various kinds of data via the IP backbone network 1000 depending on users' manipulations. The terminal 100 may perform voice or data communication and receive and use streaming data. For this, the terminal 100 of the present disclosure may include a browser for transmission and reception of information, a memory for storing programs and protocols, a microprocessor for executing, operating and controlling various kinds of programs, and the like.

Particularly, the terminal 100 according to one or more embodiments of the present disclosure may use a streaming service based on multicast technique. For this, the terminal 100 according to one or more embodiments of the present disclosure transmits a domain query message for the specific internet service server 400 in a state where the connection to one access network 2000 is established. Then, the terminal 100 may receive a domain response message as a response to the domain query message. While typically the terminal 100 accesses the internet service server 400 in accordance with the domain response message, the terminal 100 according to one or more embodiments of the present disclosure may join a multicast group by using the domain response message and use a streaming server in a multicast mode.

The terminal 100 of the present disclosure may be also referred to as user equipment (UE), a mobile station (MS), a mobile terminal (MT), a subscriber station (SS), a portable subscriber station (PSS), an access terminal (AT), or the like, and may include all or part of functions of the MT, SS, PSS, or the like. In addition, the terminal 100 may not only use a mobile terminal such as a smart phone, a tablet PC, a personal digital assistant (PDA), or a portable multimedia player (PMP), but also use a stationary terminal such as a smart TV or a desktop computer.

The service control server 200 has a domain name server (DNS) function. Namely, when a domain query message for the specific internet service server 400 is received from the terminal 100, the service control server 200 may perform a function of transmitting a domain response message to the terminal 100. Particularly, the service control server 200 according to one or more embodiments of the present disclosure may create the domain response message containing a multicast group address pre-allocated to the internet service server 400 in response to the domain query message, and may transmit the domain response message to the terminal 100. At this time, if the internet service server 400 is not the pre-agreed internet service server, the service control server 200 may transmit the domain response message containing an IP address of the internet service server 400 to the terminal 100.

On the other hand, if the internet service server 400 is the pre-agreed internet service server, the service control server 200 transmits the domain response message having the multicast group address allocated to the internet service server 400 to the terminal 100.

In order to support this process, the service control server 200 of the present disclosure may perform a process of allocating in advance the multicast group address to the pre-agreed internet service server 400. Additionally, when the registration of the internet service server 400 is completed, the service control server 200 notifies this to a streaming server 300. At this time, the service control server 200 may offer, to the streaming server 300, the content of agreement with the internet service server 400, namely, information about the type of service subscription of the internet service server 400. Then the streaming server 300 may perform differential transcoding depending on the service subscription type and support the provision of a differential streaming service.

The streaming server 300 supports the provision of a streaming service based on multicast technique. When a registration completion message containing information about the service subscription type of the internet service server 400 is received from the service control server 200, the streaming server 300 may create streaming data by differentially transcoding broadcast data of a corresponding channel on the basis of the service subscription type of the internet service server 400. At this time, if the internet service server 400 joins a premium service, the streaming server 300 may create high-speed transmittable streaming data through high-quality transcoding. Also, the streaming server 300 delivers the created streaming data to a plurality of routers 500a, 500b and 500c (hereinafter, denoted by 500 if no separate distinction is required) that support the provision of a streaming service in a multicast mode.

Particularly, the streaming server 300 of the present disclosure operates as a multicast source and delivers streaming data to one edge router connected thereto, e.g., the first router 500a. Then the first router 500a may copy and deliver the streaming data to the second and third routers 500b and 500c connected thereto. The streaming server 300 according to one or more embodiments of the present disclosure may create streaming data in accordance with an internet group management protocol (IGMP) and deliver it to the plurality of routers 500. The plurality of routers 500 of the present disclosure may form routes therebetween in accordance with a multicast protocol, e.g., protocol independent multicast source specific multicast (PIM-SSM) or protocol independent multicast spare mode (PIM-SM), copy streaming data delivered from the edge router 500a, and deliver the copied data to the other routers 500. In the present disclosure, if the plurality of routers 500 operate in accordance with the PIM-SSM protocol, the terminal 100 which is a receiver transmits a multicast group join request message (e.g., IGMP JOIN MESSAGE) for joining a multicast group by using a domain response message which is received from the service control server 200 and contains a multicast group address and a source IP address. Among the plurality of routers 500 that receive the multicast group join request message, a router, e.g., the second router 500b, connected with the access network 2000 accessed by the terminal 100 may enable the terminal 100 to join a multicast group corresponding to the multicast group address contained in the message and then offer a streaming server in a multicast mode. Also, when a group withdrawal request message is delivered from the terminal 100, the router connected with the access network 2000 accessed by the terminal 100 may remove the terminal 100 from the multicast group so as not to deliver a stream to the terminal 100.

The internet service server 400 refers to a third-party operator's server that provides a streaming service to the terminal 100 through the IP backbone network 1000 to which the streaming service providing method of the present disclosure is applied. The internet service server 400 is implemented with a web server or a web application server (WAS) and refers to a device that provides broadcast data, e.g., a baseball game broadcast or a world cup broadcast, transmitted from a head-end device (not shown) of a broadcasting station to the terminal 100 in the form of a streaming service. Typically the internet service server 400 directly provides a streaming service to the terminal 100 in a unicast mode, so that it is difficult to provide a high-quality streaming service due to several problems such as a transmission delay, a network overload, and the like. However, the internet service server 400 of the present disclosure concludes a paid-peering arrangement with the service control server 200 and enables the streaming server 300 to provide a streaming service to the terminal 100 in a multicast mode, thus allowing the provision of a high-quality streaming service.

The streaming service providing method will be described below in detail. A processor equipped in each device according to one or more embodiments of the present disclosure may process program instructions for performing the method according to the present disclosure. This processor may be a single-threaded processor in one embodiment and a multi-threaded processor in another embodiment. Further, this processor may process commands stored in a memory or storage.

The access networks 2000 according to one or more embodiments of the present disclosure may have different communication coverage and transmit or receive information to or from to the terminal 100 located in the corresponding communication coverage. The access network 2000 of the present disclosure may be connected with the terminal 100, based on various wired/wireless communication schemes, e.g., mobile communication such as Wi-Fi communication, LTE, and 3G, Bluetooth communication, and the like. Also, the access network 2000 may be implemented to include one or more base station apparatuses which not only detect the terminal 100 approaching the communication coverage, but also perform an access control and radio resource allocation for the access-requesting terminal 100, information transmission/reception of the terminal 100 through the allocated radio resource, and the like. The base station apparatus may be, for example, eNB (e Node B) in the LTE standard, and Wi-Fi AP (Access Point).

Additionally, the IP backbone network 1000 according to one or more embodiments of the present disclosure refers to a core network that supports the connection between the access networks 2000 and also supports the connection between the access network 2000 and any other communication network. The IP backbone network 1000 may be implemented with an IP network which provides a high-capacity data transmission/reception service and a seamless data service through an internet protocol (IP), and an All IP network which is an IP network structure into which different networks are integrated based on IP.

Hereinafter, main elements and an operation method of the service control server 200 according to one or more embodiments of the present disclosure will be described.

Figure 2:
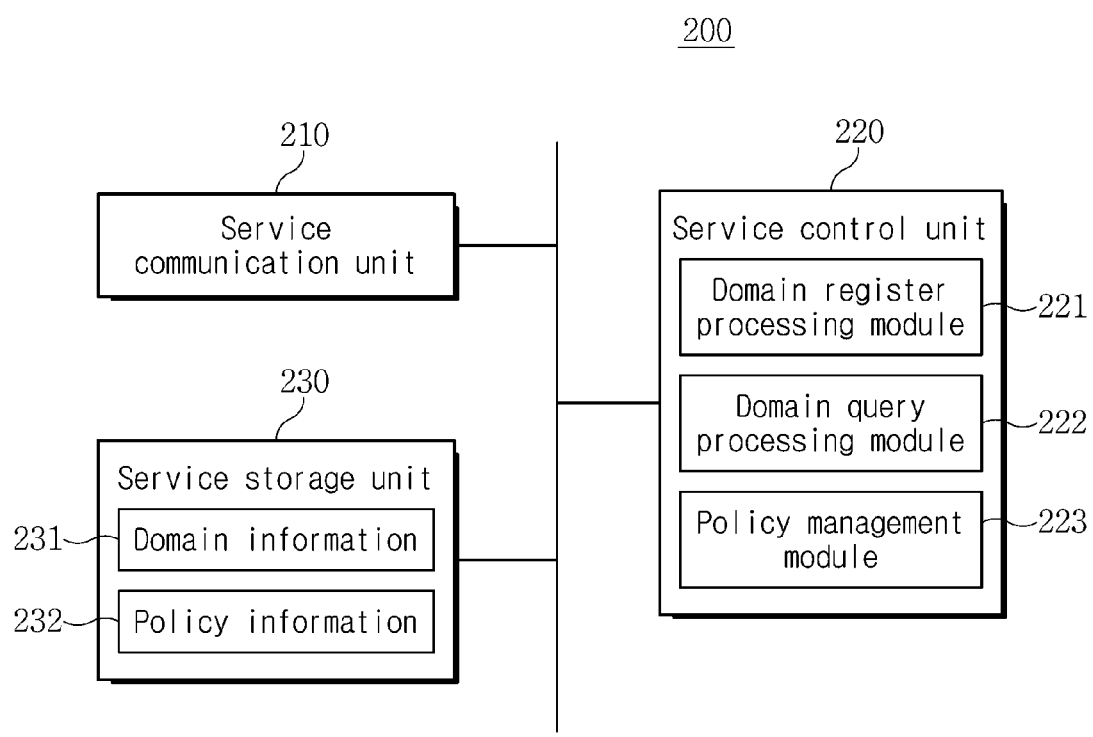
FIG. 2 is an exemplary block diagram illustrating main elements of a service control server according to one or more embodiments.

FIG. 2 is an exemplary block diagram illustrating main elements of a service control server according to one or more embodiments.

Referring to FIGS. 1 and 2, the service control server 200 according to one or more embodiments of the present disclosure may be configured to include a service communication unit 210, a service control unit 220, and a service storage unit 230.

Respective elements will be described in detail. The service communication unit 210 supports transmission and reception of information. Particularly, by interworking with the internet service server 400, the service communication unit 210 of the present disclosure may transmit or receive various kinds of information created in a service subscription process of the internet service server 400. Also, the service communication unit 210 may transmit or receive various kinds of information created in a domain query process with the terminal 100. And also, the service communication unit 210 may transmit or receive various kinds of information created for the provision of a streaming service with the streaming server 300.

The service control unit 220 performs the overall control of the service control server 200 according to one or more embodiments of the present disclosure. In view of hardware, the service control unit 220 may be configured to include at least one processor such as a central processing unit (CPU) and a micro processing unit (MPU), at least one execution memory (e.g., a register and/or a random access memory (RAM)) onto which data is loaded, and a bus for inputting or outputting data to or from the processor and the memory.

The service control unit 220 of the present disclosure supports a domain name server (DNS) function. When a domain registration request is received from the internet service server 400, the service control unit 220 of the present disclosure may allocate a multicast group address for each channel to the internet service server 400. Then, when a domain query message for the internet service server 400 is received from the terminal 100, the service control unit 220 may create a domain response message having the multicast group address previously allocated to the internet service server 400 and transmit the domain response message to the terminal 100. At this time, the service control unit 220 may create the domain response message to further contain a source IP address which is an IP address of the internet service server 400. Herein, the source IP address is used for identifying the internet service server 400. The terminal 100 that receives the source IP address may create a multicast group join request message corresponding to the internet service server 400, based on the domain response message, and then deliver the created message to the IP backbone network 1000 via the access network 2000.

Although in this embodiment the domain response message is described as containing the multicast group address and the source IP address, this is exemplary only. Alternatively, the domain response message may contain the multicast group address only. Namely, if there is only one internet service server 400, there is no need to distinguish the internet service server 400 from the other. In this case, the domain response message has only the multicast group address, and the terminal 100 may receive streaming data through the routers 500 which operate in accordance with the PIM-SM protocol. On the other hand, there are two or more internet service servers 400, multicast groups may be duplicated. In this case, it is desirable that the domain response message has both the multicast group address and the source IP address. The terminal 100 that receives this may receive streaming data through the routers 500 which operate in accordance with the PIM-SSM protocol.

In order to support the above-discussed operations, the service control unit 220 of the present disclosure may allocate the multicast group address and the source IP address for the internet service server 400 in response to the domain registration request of the internet service server 400 and then deliver related information to the streaming server 300. Herein, the internet service server 400 has already concluded a paid-peering arrangement with the service control server 200, namely, refers to a server of an operator which joins a service offered by the service control server 200. Therefore, when notifying the completion of registration for the internet service server 400 to the streaming server 300, the service control unit 220 may also provide, to the streaming server 300, information about the type of a service subscription of the internet service server 400. Then, depending on the service subscription type, the streaming server 300 may perform transcoding for providing a differential streaming service.

For the above, the service control unit 220 of the present disclosure may be configured to include a domain register processing module 221, a domain query processing module 222, and a policy management module 223. The domain register processing module 221 performs a domain registration process for the internet service server 400. The domain query processing module 222 performs a process of creating the domain response message when the domain query message is received from the terminal 100, and then providing the domain response message to the terminal 100. The policy management module 223 performs a service subscription process of the internet service server 400 and also performs a process of storing and managing service subscription information as policy information for the internet service server 400.

The service storage unit 230 may temporarily store application programs required for the operation of functions according to one or more embodiments of the present disclosure and various data created during the execution of the application programs. Particularly, the service storage unit 230 according to one or more embodiments of the present disclosure may store domain information 231 allocated to the internet service server 400 and policy information 232 according to the service subscription type. The service storage unit 230 may be formed of storage media such a flash memory, a hard disk, a multimedia card micro type memory (e.g., SD or XD memory, etc.), RAM, and ROM.

Hereinbefore, main elements of the service control server 200 are described through FIG. 2. The elements shown in FIG. 2 are, however, not always essential, and more or less elements than shown may be used for the service control server 200.

Hereinafter, main elements and an operation method of the streaming server 300 according to one or more embodiments of the present disclosure will be described.

Figure 3:
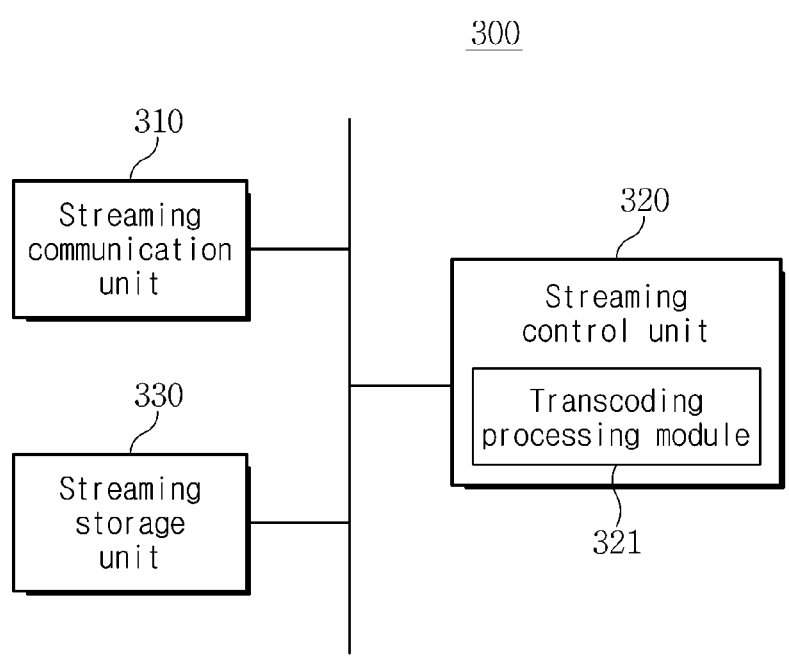
FIG. 3 is an exemplary block diagram illustrating main elements of a streaming server according to one or more embodiments of the present disclosure.

FIG. 3 is an exemplary block diagram illustrating main elements of a streaming server according to one or more embodiments of the present disclosure.

Referring to FIGS. 1 and 3, the streaming server 300 according to one or more embodiments of the present disclosure may be configured to include a streaming communication unit 310, a streaming control unit 320, and a streaming storage unit 330.

The streaming communication unit 310 may receive, from the service control server 200, a registration completion message that contains information about a service subscription type of the internet service server 400. Also, the streaming communication unit 310 may perform a function of delivering transcoded streaming data to the connected router 500. And also, the streaming communication unit 310 may perform a function of receiving broadcast data from a head-end device (not shown) of a broadcasting station.

The streaming control unit 320 performs the whole control of the streaming server 300 of the present disclosure. When the registration completion message that contains information about a service subscription type of the internet service server 400 is received from the service control server 200 through the streaming communication unit 310, the streaming control unit 320 of the present disclosure may support a process of creating streaming data by performing differential transcoding based on the service subscription type. Herein, the service subscription type is information about the content contracted with the service control server 200 by the internet service server 400 for providing a multicast streaming service to the terminal 100 through the IP backbone network 1000 of the present disclosure, and includes information about a Type of Service (ToS), for example, information about whether the internet service server 400 is in a state of joining a premium service or a normal service.

The streaming control unit 320 that identifies such information about a service subscription type differentially applies a quality of service (QoS), based on the service subscription type of the internet service server 400. Namely, the streaming control unit 320 of the present disclosure may create streaming data by performing differential transcoding of broadcast data depending on the service subscription type of the internet service server 400.

At this time, the streaming control unit 320 according to one or more embodiments of the present disclosure may create streaming data through transcoding based on MPEG media transport (MMT) technique. Herein, MMT refers to a communication standard for supporting an efficient composite content delivery service through different kinds of networks. Additionally, the streaming control unit 320 may create streaming data in accordance with various kinds of a real time streaming protocol (RTSP) other than MMT technique.

When streaming data is created, the streaming control unit 320 may store the created streaming data in the streaming storage unit 330 and also deliver the created streaming data to the connected router 500. The streaming control unit 320 of the present disclosure may deliver the streaming data to the router corresponding to a multicast group registered in the internet service server 400. The router 500 that receives the streaming data may copy and deliver the streaming data to the other routers in the multicast group.

The streaming control unit 320 of the present disclosure may be configured to include a transcoding processing module 321 for supporting the above-discussed process.

The streaming storage unit 330 stores all programs according to the execution of functions of the streaming server 300. Particularly, the streaming storage unit 430 according to the present disclosure may store and manage streaming data created by the streaming control unit 320. The created streaming data may be stored and managed through classification according to the internet service servers 400 or the multicast groups registered in the internet service server 400.

Hereinbefore, the main elements and operation methods of the service control server 200 and the streaming server 300 according to one or more embodiments of the present disclosure are described.

In view of hardware, the service control server 200 and the streaming server 300 according to one or more embodiments of the present disclosure has the same configuration as a typical web server or network server. However, in view of software, the service control server 200 and the streaming server 300 includes a program module implemented by means of computer languages such as C, C++, Java, Visual Basic, Visual C, and the like. The service control server 200 and the streaming server 300 may be implemented in the form of a web server or network server which refers to a computer system, or computer software (web server program) installed therefor, which is connected with many unspecified clients and/or other servers through an open-type computer network such as Internet, receives a task request from such a client or other web server, and provides a task result. However, the web server or network server should be understood as a broader concept including a series of application programs running thereon as well as the above-mentioned web server program and further including, in a certain case, various kinds of database constructed therein.

Additionally, the service control server 200 and the streaming server 300 of the present disclosure may be implemented as one or more servers operating in a cloud manner. In particular, all information transmitted and received through the IP backbone network 1000 of the present disclosure can be provided through a cloud computing function that can be permanently stored in a cloud computing device on the Internet. Herein, cloud computing refers to technique for providing, on demand, virtualized information technology (IT) resources, e.g., hardware (server, storage, network, etc.), software (database, security, web server, etc.), services, data, and the like, to digital terminals such as desktops, tablet computers, laptops, netbooks and smart phones by utilizing Internet technology.

In addition, the term "module" used herein may refer to a component or device which is formed of software, hardware, or combination thereof, and performs certain tasks. The module may include, for example, components, such as software components, object-oriented software components, class components and task components, processes, functions, attributes, procedures, subroutines, segments of program code, drivers, data, databases, data structures, tables, arrays, and variables. The functionality provided for in the components and modules may be combined into fewer components and modules or further separated into additional components and modules.

Although this description and drawings illustrate exemplary device elements, the subject matters and functional operations disclosed herein may be implemented by different type digital electronic circuits or implemented by computer software, firmware or hardware including a structure disclosed herein and structural equivalent thereof, or any combination thereof. The subject matters disclosed herein may be implemented by at least one computer program product, namely at least one module regarding computer program commands encoded on a program storage medium so as to control the operation of a device according to the present disclosure or allow execution thereby. A computer-readable medium may be a machine-readable storage device, a machine-readable storage board, a memory device, a machine-readable composition of material affecting wave-type signaling, or a combination thereof.

Hereinafter, a streaming service providing method according to one or more embodiments of the present disclosure will be described.

Figure 4:
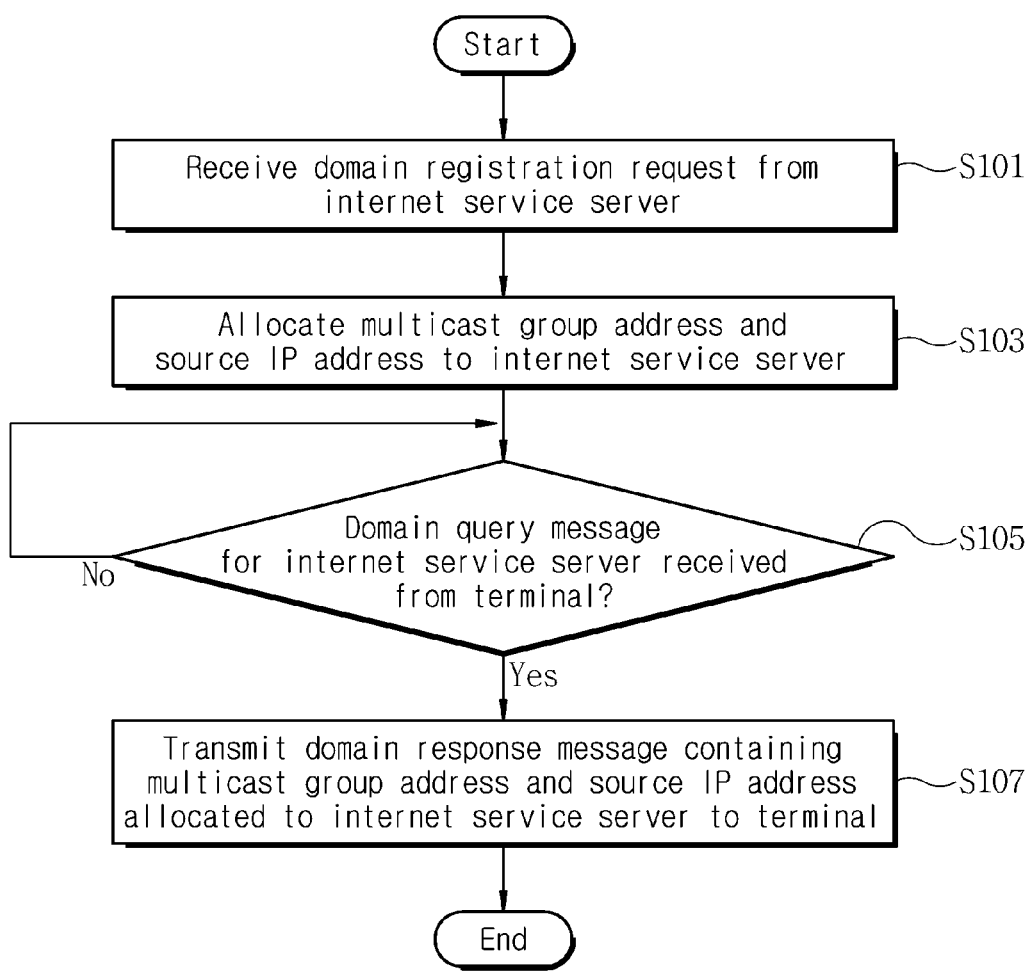
FIG. 4 is an exemplary flow diagram schematically illustrating a streaming service providing method according to one or more embodiments of the present disclosure.

FIG. 4 is an exemplary flow diagram schematically illustrating a streaming service providing method according to one or more embodiments of the present disclosure.

Referring to FIGS. 1 and 4, in order to support the provision of a streaming service for the terminal 100 by interworking with the streaming server 300, the service control server 200 of the present disclosure registers and manages a domain for the internet service server 400 to be accessed by the terminal 100.

Namely, the service control server 200 receives a domain registration request from the internet service server 400 (S101), and then performs a process of registering a domain for the internet service server 400. Herein, the internet service server 400 refers to a device that is in a state of already concluding a paid-peering arrangement with the service control server 200, namely, a device of an operator which desires to provide a streaming service, offered by the streaming server 300, to the terminal 100 through the IP backbone network 1000 managed by the service control server 200.

Therefore, a pre-agreed relationship with the service control server 200 is required for providing a streaming service to the terminal 100 by interworking with the service control server 200. For this, the internet service server 400 may first perform a process of joining a service offered by the service control server 200 before querying a domain registration request to the service control server 200. However, detailed description about this will be omitted.

When a domain registration request is received from the pre-registered internet service server 400, the service control server 200 allocates a multicast group address to the internet service server 400 (S103). At this time, the service control server 200 may further receive, from the internet service server 400, identification information for identifying the internet service server 400 and channel information for a streaming service, and then allocate the multicast group address by considering such information. Namely, using the received identification information, the service control server 200 may check whether the internet service server 400 has a pre-agreed relationship. If there is no pre-agreed relationship, the service control server 200 may deliver a notification message for guiding a service join to the internet service server 400. In case of a service join, the service control server 200 may allocate the multicast group address.

Herein, the multicast group address may be allocated according to each channel, for example, a class D address from 224.0.0.1 to 239.255.255.255. For example, channel 1 may use a multicast address of 224.1.1.1, and channel 2 may use a multicast address of 224.2.2.2. Also, for identifying the internet service server 400, the service control server 200 may allocate an IP address of the internet service server 400 as a source IP address together with the multicast group address.

The above process refers to a preparation process for providing the domain response message in response to the domain query message received from the terminal 100 by the service control server 200.

If the domain query message for the internet service server 400 is received from the terminal 100 (S105) after the multicast group address is allocated to the internet service server 400, the service control server 200 of the present disclosure transmits, to the terminal 100, the domain response message that contains the multicast group address allocated to the internet service server 400 (S107).

Then, by using the multicast group address, the terminal 100 may use a streaming service in a multicast mode. At this time, the service control server 200 may create the domain response message to further contain the source IP address for the internet service server 400, and may transmit it to the terminal 100. Then, by using both the multicast group address and the source IP address, the terminal 100 may receive and use streaming data in accordance with the PIM-SSM multicast protocol.

Hereinafter, the streaming service providing method according to one or more embodiments of the present disclosure will be described in more detail.

Figure 5:
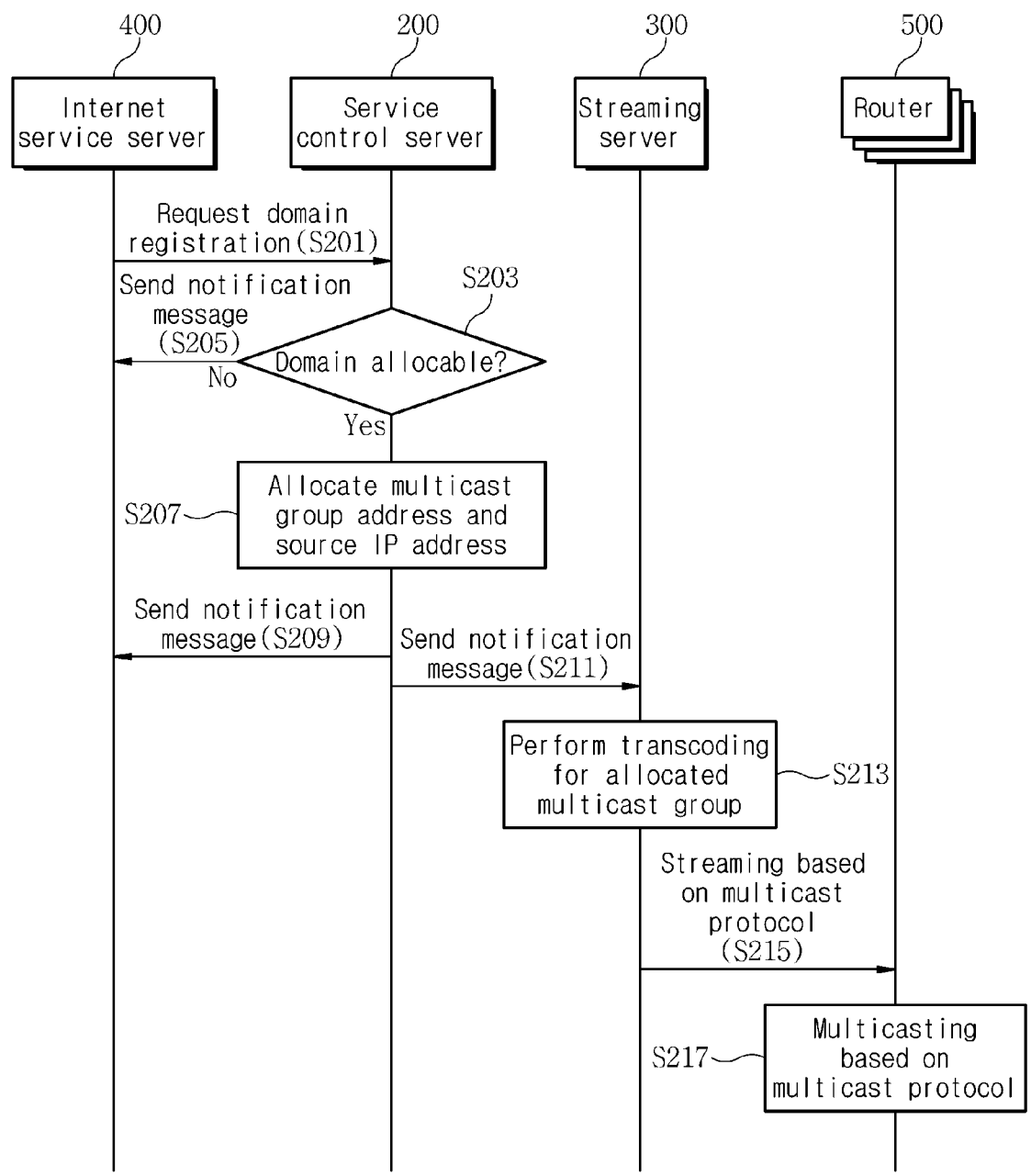
FIGS. 5 and 6 are flow diagrams illustrating in detail a streaming service providing method according to one or more embodiments of the present disclosure.
Figure 6:
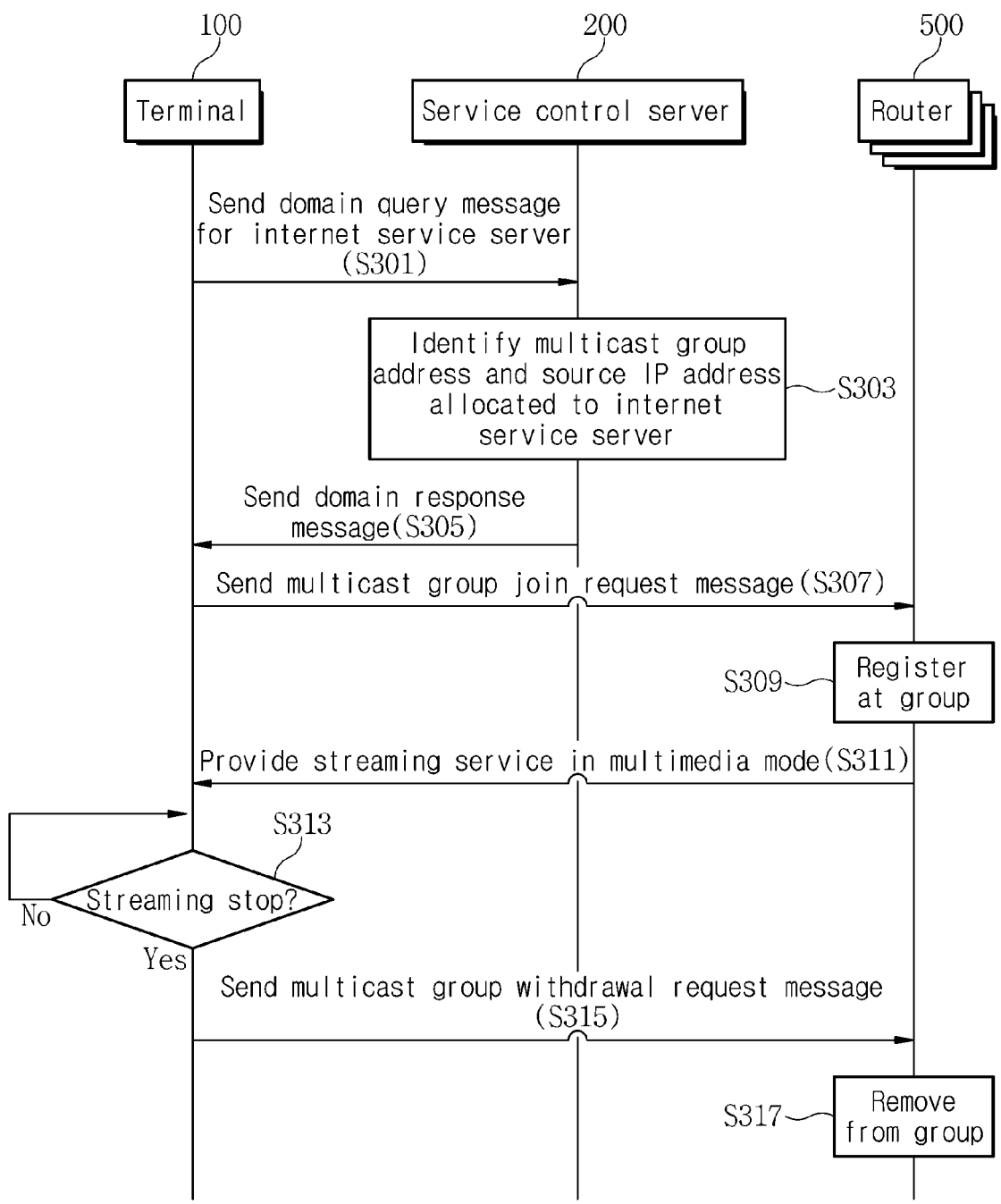

FIGS. 5 and 6 are flow diagrams illustrating in detail a streaming service providing method according to one or more embodiments of the present disclosure.

Between them, FIG. 5 relates to preparatory steps. For using a streaming service of the present disclosure, the internet service server 400 sends a domain registration request to the service control server 200 (S201). Then the service control server 200 checks whether the internet service server 400 is a subscriber (S203), namely, checks whether a paid-peering arrangement is concluded. If domain allocation is not possible due to the absence of a paid-peering arrangement, the service control server 200 may transmit, to the internet service server 400, a notification message for indicating a need for a paid-peering arrangement. On the other hand, if there is a paid-peering arrangement and thereby domain allocation is possible, the service control server 200 allocates a multicast group address and a source IP address to the internet service server (S207). In this case of allocating the source IP address, the plurality of routers 500 may operate in accordance with the PIM-SSM protocol. After this process is completed, the service control server 200 may notify the internet service server 400 that registration is completed normally. Also, when the domain query message for the internet service server 400 is received from the terminal 100, the service control server 200 having a DNS function may provide, as the domain response message, the allocated multicast group address to the terminal 100.

Additionally, the service control server 200 may transmit, to the streaming server 300, a registration completion message that contains information about a service subscription type for the internet service server 400 (S211). Then, depending on the service subscription type, the streaming server 300 performs differential transcoding corresponding to the allocated multicast group (S213).

Then the streaming server 300 delivers, to the router 500, streaming data created through transcoding based on the multicast protocol. At this time, the streaming server 300 may deliver the streaming data to the edge router 500 connected with the streaming server 300. Then the router 500 may perform a multicasting process of copying and delivering the streaming data to the plurality of routers located on a transmission route (S217).

Herein, steps S215 and S217 may be performed after a request of the terminal 100 occurs. Without any request of the terminal 100, multicasting between the routers 500 may be performed previously.

The subsequent operations will be described with reference to FIG. 6.

Referring to FIG. 6, the terminal delivers a domain query message for the internet service server 400 to the service control server 200 (S301). For example, the terminal 100 may deliver, to the service control server 200, the domain query message that is produced in response to an input of a uniform resource locator (URL) of a world cup broadcast site offered by the internet service server 400.

Then the service control server 200 identifies a multicast group address and a source IP address allocated to the internet service server 400 (S303), and transmits, to the terminal 100, a domain response message containing the multicast group address and the source IP address in response to the domain query message. While a typical domain query process returns an IP address of the internet service server 400 through the domain response message, the present disclosure returns the multicast group address allocated to the internet service server 400 through the domain response message.

Then the terminal 100 delivers a multicast group join request message to the plurality of routers 500 by using the multicasts group address. Then the router 500 registers the terminal 100 in the multicast group (S309), and provides a streaming service in a multimedia mode (S311).

Thereafter, if there is a user's request for a streaming stop (S313), the terminal 100 delivers a multicast group withdrawal request message to the router 500 (S315). Then the router 500 removes the terminal 100 from the multicast group (S317) so as not to transmit the streaming data to the terminal 100.

Hereinbefore, the streaming service providing method according to embodiments of the present disclosure is described.

The above-discussed streaming service providing method of the present disclosure may be provided in the form of a computer-readable medium suitable for storing computer program instructions and data. A program recorded on a recording medium for implementing the streaming service providing method according to one or more embodiments of the present disclosure may execute steps of, at the service control server, receiving a domain query message for a specific internet service server from a terminal, and of, at the service control server, supporting a use of a streaming service of the terminal by transmitting a domain response message containing a multicast group address allocated to the internet service server to the terminal in response to the domain query message.

In this case, a program recorded on the recording medium may perform the above-described functions by being read, installed and executed in the computer.

In order to allow the computer to read the program recorded on the recording medium and to execute the functions implemented by the program, the above-described program may include codes encoded in computer languages such as C, C++, JAVA, and machine language which can be read through a device interface of the computer by a processor (CPU) of the computer.

This code may include a function code related to a function or the like that defines the above-described functions, and may include an execution procedure-related control code necessary for the processor of the computer to execute the above-described functions in accordance with a predetermined procedure. Also, such a code may further include a memory reference related code as to which additional information or media required for the processor of the computer to execute the above-described functions should be referenced at any location (address) of the internal or external memory of the computer. In addition, when the processor of the computer needs to communicate with any other computer, server, etc., which are at remote locations, to perform the above-described functions, the code may further include a communication-related code as to how to communicate with which remote computer, server, etc., what information or media should be transmitted or received during communication, and the like.

This computer-readable medium, e.g., a recording medium, suitable for storing computer program instructions and data includes magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), a flash memory, an erasable programmable ROM (EPROM), and an electrically EPROM (EEPROM). A processor and memory may be supplemented by or integrated with specific-purpose logical circuit.

Further, the computer-readable recording medium may be distributed over networked computer systems so that computer-readable code can be stored and executed in a distributed fashion. In addition, functional programs and their associated code and code segments for implementing the present disclosure may be easily deduced or altered by programmers of the technical field of the present disclosure in consideration of the system environment of a computer that reads a recording medium and executes the program.

While the present disclosure contains many specific implementation details, these should not be construed as limitations on the scope of the present disclosure or of what may be claimed, but rather as descriptions of features that may be specific to particular embodiments of particular disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

What is claimed is:

1. A streaming service providing method in a multicast system including a service control server having a domain name server (DNS) function, a streaming server for supporting provision of a streaming service, and a plurality of routers for delivering streaming data, in a multicast mode, received from the streaming server,
the method comprising:
at the service control server, receiving a domain registration request from an internet service server;
at the service control server, allocating a multicast group address for each channel and a source IP address to the internet service server;
at the service control server, receiving a domain query message for the internet service server from a terminal; and
at the service control server, supporting a use of a streaming service of the terminal by transmitting a domain response message containing the multicast group address allocated to the internet service server to the terminal in response to the domain query message,
wherein the supporting the use of the streaming service includes:
at the service control server, transmitting the domain response message containing the source IP address together with the multicast group address allocated to the internet service server to the terminal;
at the terminal, delivering a multicast group join request message to a router of the plurality of routers so as to join a multicast group by using the multicast group address and the source IP address; and
at the router connected with the terminal among the plurality of routers, providing streaming data, received from the streaming server, to the terminal in a multicast mode by registering the terminal in the multicast group when the multicast group join request message is received from the terminal.

2. The method of claim 1, further comprising:
at the service control server, delivering a registration completion message containing information about a service subscription type of the internet service server to the streaming server;
at the streaming server, creating streaming data by performing differential transcoding for broadcast data of a corresponding channel, based on the service subscription type; and
at the streaming server, delivering the created streaming data to the router.

3. The method of claim 2, wherein the streaming server performs the differential transcoding based on MPEG media transport (MMT) technique.

4. The method of claim 1, further comprising:
when a multicast group withdrawal request message is received from the terminal, at the router connected with the terminal, stopping the step of providing the streaming data to the terminal.

\* \* \* \* \*